United States Patent [19]

Lombardi et al.

[11] 4,237,185

[45] Dec. 2, 1980

[54] RADIATION CURABLE TRANSPARENTIZING RESIN SYSTEMS, METHODS AND PRODUCTS

[75] Inventors: Louis J. Lombardi, Neenah, Wis.; Roy J. Coyne, Oak Lawn, Ill.

[73] Assignee: The Richardson Company, Des Plaines, Ill.

[21] Appl. No.: 5,168

[22] Filed: Jan. 22, 1979

Related U.S. Application Data

[63] Continuation-in-part of Ser. No. 831,805, Sep. 9, 1977, abandoned.

[51] Int. Cl.$^2$ .................... G03C 1/68; C08F 2/50; B32B 29/06
[52] U.S. Cl. .................... 428/337; 204/159.16; 204/159.23; 427/53.1; 427/54.1; 428/514; 428/918; 430/281; 430/285; 430/286
[58] Field of Search .................... 427/53, 54, 161; 204/159.16, 159.23; 428/514, 537, 918, 337; 96/86 P, 351

[56] References Cited

U.S. PATENT DOCUMENTS

| | | | |
|---|---|---|---|
| 3,359,129 | 12/1967 | Mao | 204/159.23 |
| 3,661,576 | 5/1972 | Crary | 96/86 P |
| 3,813,261 | 5/1974 | Muller | 427/161 |
| 3,926,640 | 12/1975 | Rosen | 96/115 P |
| 3,926,641 | 12/1975 | Rosen | 430/281 X |
| 3,931,075 | 1/1976 | Trecker et al. | 260/23 EP |
| 3,979,270 | 9/1976 | Trecker et al. | 204/159.14 |
| 3,992,276 | 11/1976 | Powanda et al. | 427/53.1 X |
| 4,066,582 | 1/1978 | Babian et al. | 260/17 A |
| 4,076,665 | 2/1978 | Lawson | 260/22 CB |
| 4,076,895 | 2/1978 | Theno | 428/516 |
| 4,137,046 | 1/1979 | Kolke et al. | 428/537 X |
| 4,146,452 | 3/1979 | Weber et al. | 428/514 X |
| 4,171,387 | 10/1979 | Fogle et al. | 427/54.1 |

*Primary Examiner*—Harold Ansher
*Attorney, Agent, or Firm*—Lockwood, Dewey, Alex & Cummings

[57] ABSTRACT

Cellulose materials such as paper and card stocks are provided in a generally transparent or so-called transparentized form while substantially maintaining the initial strength and stiffness of the pretreated stock. A generally opaque stock is treated with a solventless resin system which is cured by actinic radiation in order to thereby transparentize the stock without subjecting it to lengthy and relatively severe wetting conditions.

23 Claims, No Drawings

RADIATION CURABLE TRANSPARENTIZING RESIN SYSTEMS, METHODS AND PRODUCTS

BACKGROUND AND DESCRIPTION OF THE INVENTION

This is a continuation-in-part application of application Ser. No. 831,805, filed Sept. 9, 1977, now abandoned.

The present invention generally relates to transparentized paper and card stocks and the preparation thereof. More particularly, this invention is directed to a cellulose-based transparentized stock, a method of producing such stock with a solventless radiation-curable resin system, the solventless system itself, and the use thereof in producing transparentized stock.

Conventionally, transparentized paper stocks, understood in the art as possessing general transparent properties that fall short of being truly clear such as tracing paper or onionskin products, are produced by saturating a generally opaque paper stock with a solvent-containing or solvent-based resin or the like in order to impregnate the stock with the resin. This solvent-saturated stock is then rolled up, heated to temperatures on the order of 180° F., and stored in a hot room for a substantial period of time so that the impregnated resin may continue to wet or solventize the paper and bring about the desired transparentizing, which lengthy wetting procedure in the presence of a solvent brings with it a weakening of the paper stock. While this strength reduction is a property that is not desired even for products such as tracing paper or onionskin paper, it becomes a serious problem when attempting to form transparentized card stock for any number of uses such as in the manufacture of credit cards.

There is accordingly a need for a transparentized cellulose product and method for preparing same which avoids the strength-deteriorating aspect of conventional transparentizing systems since it does not require saturating the paper with a solvent for the paper and maintaining that solvent saturation for long periods of time at elevated temperatures. It has now been discovered that certain resin systems, which are of the solventless type and that are polymerizable by actinic radiation, are able to perform the desired transparentizing function without significantly reducing the strength of the stock treated, whether it be a thin paper stock or a stiff card stock.

Solventless, actinic radiation curable resin systems in general are well-known and have been formulated to accomplish a wide variety of tasks in various industries, being included, for example, in coating formulations, ink formulations, printing plates and the like, there having been recognized that because such systems are solventless, they bring with them the advantage of avoiding the need to remove volatile solvents, thereby eliminating unnecessary waste, and more importantly minimizing environmental and health hazards. Heretofore, it has not been appreciated that the solventless, radiation curable resin systems of the present invention are capable of transparentizing cellulose stock while avoiding significant deterioration in the strength of that stock. These advantages have been found to be obtainable by the present invention which includes the use of solventless, radiation-curable resin systems that are a formulation of acrylate monomers, a photosensitizer, and an acrylate oligomer, preferably also in combination with a copolymer. These resin systems are applied to the stock to be transparentized, followed by exposure to actinic radiation which cures the resin system and also causes the desired transparentizing function. Such procedures have been discovered to bring with them the only minimal deterioration, if any, in the strength of the stock when compared with its pretreated state.

It is, therefore, a general object of the present invention to provide improved transparentizing functions.

Another object of this invention is to provide an improved transparentized stock and method of its production which avoids any significant deterioration in the strength of the stock prior to the transparentizing treatment.

Another object of the present invention is an improved resin system that is capable of transparentizing cellulose stock upon curing with actinic radiation.

Another object of this invention is to provide an improved card stock that is generally transparent or translucent and which has been prepared by the radiation curing of an opaque card stock that has been treated with a solventless resin system.

Further objects and advantages of the present invention will become apparent from the following description. While it is particularly advantageous to use the present invention in connection with transparentized card stocks because of the importance to retain the strength of such stocks, the invention is also useful in connection with the transparentizing of stocks that are not as thick or stiff as card stocks, especially when it is desired to maintain the strength of such lighter weight stocks. Other uses for this innovation will be apparent to those skilled in the transparentizing art.

The transparentizing resin system of this invention includes one or more acrylate monomers, a photosensitizer, and an acrylate oligomer, thse formulations being curable by actinic radiation, and when they are so cured in a cellulose stock, transparentize that stock. Preferably, these formulations further include a copolymer of an alkyl group and an unsaturated hydrocarbon.

Advantageously, the formulation includes more than one acrylate monomer, the system having one or more of the following acceptable monomers: hexanediol diacrylate, stearyl methacrylate, one or more pentaerythritol polyacrylates such as the pentaerythritol triacrylates, pentaerythritol tetracyrlates and pentaerythritol diacrylates, including a blend of primarily triacrylates and tetracrylates of pentaerythritol having a functionality on the order of between about 2.8 and 3.3, which can be represented by the following general formula:

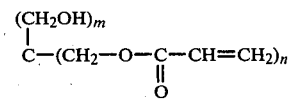

where n can be between 2 and 4, preferably between 2.5 and 3.5, the value of m being such that the value of m plus the value of n total 4. The preferred degree of acrylation is 3.2. One or more of these acrylate monomers are present within the formulation at a total parts by weight content of about 20 to about 70, preferably between about 35 and 60, parts by weight.

In general, any photosensitizer capable of functioning in a solventless resin system is suitable for use in this invention. Usually, such photosensitizers fall within the general characterization of aromatic ketone or tertiary amine. Acceptable photosensitizers include liquid benzoin isobutyl ether, p-chlorobenzophenone, αα-diethoxyacetophenone, and dimethoxyphenylacetophenone. Other less acceptable photosensitizers include benzil, thioxanthone, anthraquinone, dibenzosuberone, dimenthylaminobenzophenone (Michler's Ketone), diethylaminobenzophenone, triethanolamine, and dibutylethanolamine. A particularly preferred photosensitizer is benzophenone, which is especially suitable due to its relatively low cost, its general overall stability, its coloration neutrality, and its solubility properties for a solventless system such as the present resin formulations. The photosensitizer is present within the present formulation as a weight percent between about .5 to about 30 parts by weight, preferably about 8 to 20 parts by weight.

Acrylate oligomers included in the formulations of this invention fall within the general class of compositions incorporating ethylenically unsaturated polyhydroxy diester polyethers that are photopolymerizable. Found to be particularly acceptable are diacrylates that are derived from an aliphatic/bisphenol-A diepoxide blend, the bisphenol-A diepoxide making up approximately less than 15% of the blend; these acrylated monofunctional epoxidized novolacs have terminal acrylate functionality making them highly active toward radiation and cure. Such oligomers are highly compatible with the acrylate monomers used in these formulations, while exhibiting an extremely low vapor pressure, generally having less than 0.5% volatiles. The preferred oligomers are believed to have the following general formula:

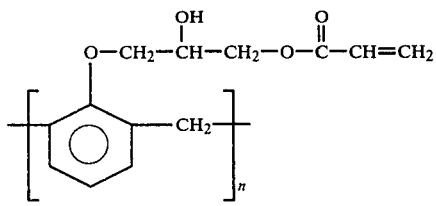

wherein n averages between about 5 and 8. Compounds of this type, which are described in more detail in U.S. Pat. No. 3,661,576, the disclosure of which is herein incorporated by reference, are included in the present formulation on a parts by weight basis of between about 15 to 60 parts by weight, preferably about 20 to about 50 parts by weight.

When the copolymer is optionally included in the formulations of this invention, it generally is a vinyl aromatic/alkyl alcohol copolymer present in an amount of from about 0 to about 15 parts by weight, preferably between about 1 and about 8 parts by weight. The alkyl alcohol group of the copolymer generally has from 2 to 10 carbon atoms, and the preferred copolymer is a styrene-allyl alcohol copolymer. Copolymers of this type are solid at room temperature, and when included in the overall system of this invention they are not esterified with any acid material, preferably being kept below their esterification temperature of about 350° F.

Products of this invention, which are of the transparentized type, possess approximately the same strength and stiffness characteristics as do the respective stocks from which they were produced. Generally, the original stock will be a cellulose material of the usual opaque variety. The products are these original stocks which have been treated with the solventless resin system according to this invention and then have been transparentized through the operation of actinic radiation thereon. Such original stocks may have a weight as low as 9 pounds and as high as that of card stock, which can have a thickness as great as 1 millimeter. These products may be printed on through the operation of any number of the usual techniques, while the original strength and rigidity of the stock is substantially maintained although it has been transparentized.

In proceeding with the method of this invention, a paper stock is treated with a resin system in accordance with this invention, followed by curing with actinic radiation to thereby render the stock material generally transparent or translucent. Various types of actinic radiation may be employed. A class of actinic radiation especially useful herein is ultraviolet light within the wavelength range of about 2,000–6,500 Angstroms, normally found in radiation emitted from the sun or from artificial sources such as sun lamps, black lights, U.V. lamps, carbon arc lamps, xenon arc lamps, mercury vapor lamps, and tungsten halide lamps. The preferred actinic radiation is an ultraviolet light source which has a wavelength between about 2,000–4,000 Angstroms.

With more particular reference to the step of treating the stock with the solventless resin system, inasmuch as the stock does not merely have a coating actinicly cured thereupon, but since it is transparentized by the curing step, the treating step inherently involves a more penetrating type of treatment than that undergone in forming a decorative or protective coating onto the surface of a cellulosic stock. The treating step according to this invention involves contacting the stock material so as to include the solventless resin within the cellulosic stock to an extent that is sufficient to transparentize the stock when it is subjected to actinic radiation. An important feature of this invention is that the actinic radiation of the curing step is administered while the solventless resin is thus within the stock.

The curing step should begin within a relatively short time period after the treating step to avoid rendering the cellulosic stock soggy and reduce its strength. Because the solventless resin systems of this invention transparentize by curing actinicly rather than by the action of a solvent within which the stock is saturated for several hours, the cellulosic stock fibers are not themselves made soggy by virtue of the activity of a solvent system itself upon the fibers of the stock over time, which occurs in transparentizing functions of the type developed in prior solvent transparentizing systems. Instead, the solventless resin systems of this invention have been found to achieve a transparentizing function by the actinic radiation curing of these resins while they are within a cellulosic stock. If the resin systems merely remain as coatings on the stock without significantly penetrating the surface of the stock, the resin will form a cured coating on the stock, which coating would be in the nature of an ink, were pigments or dyes to be included in the formulation.

Accordingly, the curing step should follow the treating step by such a period of time and under conditions such that the stock will become impregnated or saturated with the solventless resin but will not become significantly deteriorated in strength and stiffness or become soggy. Once the actinic radiation curing step is carried out, the solventless resin is no longer in its generally fluid state, but it has been found to work on the cellulosic fibers and transparentize them as it is solidified, or cured, by the actinic radiation.

In a preferred embodiment, a web of the cellulosic stock is dipped into the resin, such as by being run through a tray or bath of the solventless resin system in order to carry out the treating step to generally impregnate or saturate the stock, and the curing step follows within about 10 seconds to about a few minutes, such as about 4 minutes, the actual optimum time period varying depending upon the weight and makeup of the stock, the particular resin system being used, whether any intermediate handling of the stock can be carried out, and the like. It is typically useful to have the surface of the treated stock web scraped or "squeegeed" in order to remove excess resin from the surface and physically move the resin into or within the stock prior to carrying out the curing step. Usually, the time period between treating and curing will be between about 20 seconds and about 2 minutes, preferably not more than 1 minute.

EXAMPLE 1

A resin system was prepared having the following formulation, based on 200 total parts by weight. Included were the following acrylate monomers: 63.68 parts hexanediol diacrylate, 2.94 parts stearyl methacrylate, and 35.16 parts pentaerythritol triacrylate, which is usually supplied as a blend of triacrylates, tetracrylates and a minor amount of diacrylates of pentaerythritol having an average functionality between about 2.8 and 3.3. The photosensitizers were 21.37 parts benzophenone and 3.75 parts triethanolamine. The acrylate oligomer was 68.90 parts of XD-8031 (The Dow Chemical Company, U.S. Pat. No. 3,661,576, a diacrylate oligomer derived from an aliphatic/bishphenol-A diepoxide blend). Also present was 4.20 parts of the copolymer RJ-100 (Monsanto Chemical Company, a styrene-allyl alcohol copolymer). This formulation was coated upon a card stock by fully immersing the stock within the formulation for about 30 seconds until the stock was substantially impregnated or saturated with the solventless resin, which was promptly followed by curing the resin while within the stock with a source of ultraviolet light. The stock transparentized to form a strong and stiff generally transparent stock suitable for printing and use as credit cards or the like. Throughout this run, the stock was not permitted to become soggy, nor was it solventized, and no solvent had to be driven off since no solvent was included in the formulation within the stock.

One of the objects of this run was to get maximum percent actinic transmission in a sheet of 7.0 mil card stock which was made from bleached soft and hardwood kraft fibers. Percent actinic transmission is a measure of the amount of actinic light which is allowed to pass through a translucent or partially translucent object. In this instance the object was the 7.0 mil card stock. Data collected comparing the untreated stock with that treated according to this example are as follows:

|  | UN-TREATED | TREATED |
|---|---|---|
| Basis weight 17 × 22 — 500 | 35.5 lb. | 53.4 lb. |
| Per cent pickup | — | 50.4 |
| Basis weight 17 × 22 — 500 (aged) (The aging took place in a circulating air oven at 100° C. for a period of 24 hours.) | — | −3.5 |
| Per cent change | — | 6.8 |

-continued

|  | UN-TREATED | TREATED |
|---|---|---|
| Caliper (mils) | 6.7 | 6.8 |
| Caliper (mils) aged | 6.7 | 6.8 |
| MIT Fold - machine direction | — | 4 |
| MIT Fold - machine direction (aged) | — | 0 |
| Taber Stiffness | 6/14 | 13/18 |
| Taber Stiffness (aged) | — | 14/20 |
| Per cent Opacity | 92.0 | 38.3 |
| Per cent Opacity (aged) | 92.4 | 67.8 |
| Per cent Actinic Transmission | 99.0 | 36.0 |
| Per cent Actinic Transmission (aged) | 100.0 | 44.5 |

It will be apparent to those skilled in the art that the present invention can be embodied in various forms. Accordingly, this invention is to be construed and limited only by the scope of the appended claims.

We claim:

1. A transparentized cellulosic product comprising: a cellulosic stock material having a preselected initial strength and stiffness, said cellulosic stock material having been transparentized in the absence of a solvent by radiation curing of a solventless, radiation-curable resin system while that resin system is within said cellulosic stock material, said stock material having been treated with said resin system to include the resin system within the stock material to an extent sufficient that the stock is transparentized when subjected to actinic radiation, said sufficient extent being limited in order to form a transparentized cellulosic product having a strength and stiffness substantially the same as said initial strength and stiffness, said solventless, radiation-curable resin system including an acrylate monomer, a photosensitizer and an acrylate oligomer, said acrylate oligomer being a diacrylate oligomer derivative of an aliphatic/bisphenol-A diepoxide blend.

2. The product of claim 1, wherein said initial strength and stiffness of the cellulosic stock material is expressed as having a weight within the range of between 9 pounds up to as high as that of card stock.

3. The product of claim 1, comprising a substantially transparent card having a thickness as great as 1 millimeter.

4. The product of claim 1, wherein said acrylate monomer is selected from the group consisting of hexanediol diacrylate, stearyl methacrylate, pentaerythritol triacrylate, pentaerythritol tetraacrylate, pentaerythritol diacrylate, and blends thereof.

5. The product of claim 1, wherein said photosensitizer is an aromatic ketone or a tertiary amine.

6. The product of claim 1, wherein said photosensitizer is benzophenone.

7. The product of claim 1, wherein said solventless, radiation-curable resin system includes about 20 to about 70 weight percent of said acrylate monomer, about 5 to about 30 weight percent of said photosensitizer, about 15 to about 60 weight percent of said acrylate oligomer, and about 0 to about 15 weight percent of a vinyl aromatic/alkyl alcohol copolymer.

8. The product of claim 3, wherein said vinyl aromatic/alkyl alcohol copolymer is a copolymer of styrene and allyl alcohol.

9. The product of claim 1, wherein said limited sufficient extent includes beginning said subjecting to actinic radiation within a relatively short period of time after the stock material has been treated with the resin system.

10. The product of claim 9, wherein said relatively short period of time is between about 10 seconds and about a few minutes.

11. The product of claim 9, wherein said relatively short period of time is between about 20 seconds and about 2 minutes.

12. A transparentized cellulosic product comprising: a cellulosic stock material having a preselected initial strength and stiffness, said cellulosic stock material having been solventlessly transparentized by treating to generally saturate said cellulosic stock material in the absence of a solvent in order in include therewithin a solventless, radiation-curable resin system, and subjecting the resin-saturated cellulosic stock material to a source of actinic radiation to cure the resin system while within the cellulosic stock material for transparentizing the same, said transparentized cellulosic product having a transparentized strength and stiffness substantially the same as said initial strength and stiffness, said solventless, radiation-curable resin system including an acrylate monomer, a photosensitizer and an acrylate oligomer, said acrylate oligomer being a diacrylate oligomer derivative of an aliphatic/bisphenol-A diepoxide blend.

13. The product of claim 14, wherein said treating includes dipping the stock material within a supply of the solventless resin system.

14. The product of claim 14, wherein said subjecting with actinic radiation begins within a relatively short period of time after said treating to generally saturate the cellulosic stock material.

15. The product of claim 16, wherein said relatively short period of time is between about 10 seconds and about a few minutes.

16. The product of claim 12, wherein said solventless, radiation-curable resin system includes about 20 to about 70 weight percent of said acrylate monomer, about 5 to about 30 weight percent of said photosensitizer, about 15 to about 60 weight percent of said acrylate oligomer, and about 0 to about 15 weight percent of a vinyl aromatic/alkyl alcohol copolymer.

17. A method for producing transparentized cellulosic material having approximately the same strength and stiffness of the original untransparentized cellulosic stock material comprising: selecting a cellulosic stock material; treating the stock in the absence of a solvent by including therewithin a solventless, radiation-curable resin system to an extent sufficient that the stock is transparentized when subjected to actinic radiation, said sufficient extent being limited in order to form a transparentized cellulosic product without significantly reducing said original strength and stiffness, said solventless, radiation-curable resin system is formulated by mixing together an acrylate monomer, a photosensitizer, and an acrylate oligomer, said acrylate oligomer being a diacrylate oligomer derivative of an aliphatic/bisphenol-A diepoxide blend; and curing the resin-treated cellulosic stock material for transparentizing the same to a generally transparent product having a strength and stiffness approximately the same as said strength and stiffness of the untransparentized cellulosic stock material.

18. The method of claim 17, wherein said solventless, radiation-curable resin system is formulated by mixing together about 20 to about 70 weight percent of said acrylate monomer, about 5 to about 30 weight percent of said photosensitizer, about 15 to about 60 weight percent of said acrylate oligomer, and about 0 to about 15 weight percent of a vinyl aromatic/alkyl alcohol copolymer.

19. The method of claim 17, wherein said treating step includes saturating the solventless resin system into the stock material.

20. The method of claim 17, wherein said treating step includes dipping the stock material within a supply of the solventless resin system.

21. The method of claim 17, wherein said treating step includes dipping the stock material into a supply of the solventless resin system and scraping off any excess resin.

22. The method of claim 17, wherein said limited sufficient extent includes beginning said curing step within a relatively short period of time after said treating step is begun.

23. The method of claim 22, wherein said relatively short period of time is between about 10 seconds and about a few minutes.

* * * * *

UNITED STATES PATENT AND TRADEMARK OFFICE
CERTIFICATE OF CORRECTION

PATENT NO. : 4,237,185
DATED : December 2, 1980
INVENTOR(S) : Louis J. Lombardi and Roy J. Coyne It is certified that error appears in the above-identified patent and that said Letters Patent are hereby corrected as shown below:

Column 2, line 36, "thse" should be --these--.

Claim 13, line 26, "14" should be --12--.

Claim 14, line 29, "14" should be --12--.

Claim 15, line 33, "16" should be --14--.

Signed and Sealed this

Seventeenth Day of March 1981

[SEAL]

Attest:

RENE D. TEGTMEYER

Attesting Officer

Acting Commissioner of Patents and Trademarks